G. A. CLEMENT.
MULTIFOCAL LENS.
APPLICATION FILED MAR. 31, 1921.

1,401,238. Patented Dec. 27, 1921.

INVENTOR.
George A. Clement
BY
ATTORNEYS

UNITED STATES PATENT OFFICE.

GEORGE A. CLEMENT, OF MOUNT VERNON, NEW YORK, ASSIGNOR TO GENERAL OPTICAL COMPANY, A CORPORATION OF NEW YORK.

MULTIFOCAL LENS.

1,401,238.     Specification of Letters Patent.     Patented Dec. 27, 1921.

Application filed March 31, 1921. Serial No. 457,239.

*To all whom it may concern:*

Be it known that I, GEORGE A. CLEMENT, a citizen of the United States, residing at Mount Vernon, in the county of Westchester and State of New York, have invented certain new and useful Improvements in Multifocal Lenses, of which the following is a full, clear, and exact description.

This invention relates to multifocal ophthalmic lenses and consists of the process of making such lenses whereby the optical centers of the various fields of vision may lie at a single point in the finished lens or may be spaced from each other any distance in accordance with the requirements and to suit the convenience of the persons who use the lenses.

The process and the novel structure will be described in detail in connection with the accompanying drawing, in which—

Figure 6:
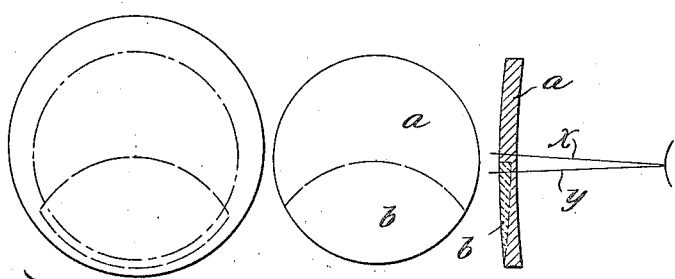
Fig. 6 shows the semi-finished blank of Fig. 4 with the outline of the finished lens traced thereon, also a face view of the lens cut from the blank along the traced line and also a sectional view of the cutout lens, the optical center of the finished surface being on the line of joinder between the two abutting pieces of glass of Figs. 1 and 2.
Figure 8:
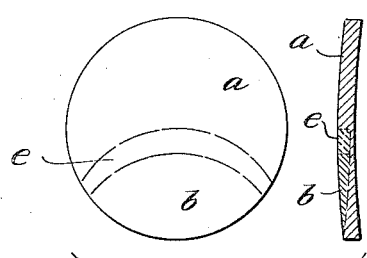
Figure 7:
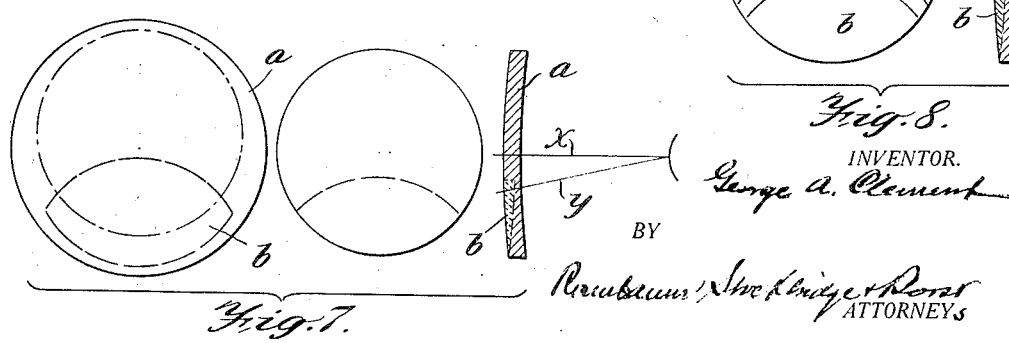

Fig. 7 consists of three views similar to those of Fig. 6, but illustrating how the finished lens may be cut out of the blank so as to separate the optical centers of two different fields of vision, and Fig. 8 is a view similar to the two right-hand views of Fig. 6 showing a finished trifocal lens made in accordance with the same method as the bifocal.

Figure 1:
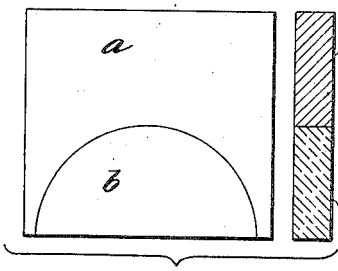
Figure 1 is a face and a sectional view of two pieces of glass joined edge to edge as contemplated by my invention.
Figure 2:
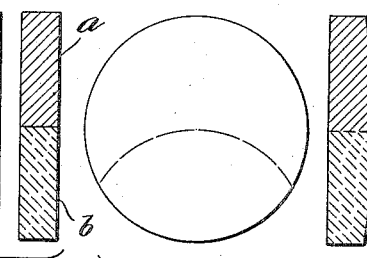
Fig. 2 illustrates a later step in the treatment of the parts shown in Fig. 1.

In carrying out my process I first take a plate of glass, indicated by $a$, and remove from it a substantially semi-circular portion forming a recess, into which I fit edge to edge another piece of glass of a different refractive index and indicated by $b$. These two pieces of glass thus associated are preferably fused together into one integral piece of glass. The plate is then preferably made into the form of a large button or disk, as indicated in Fig. 2, through the center of which the joint between the two kinds of glass passes. The back of this button is then provided with a finished curved surface $c$ of a given required lenticular power by a usual grinding and finishing method.

Figure 3:
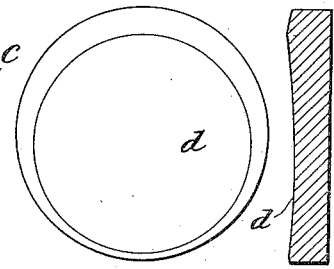
Fig. 3 is a face and a sectional view of a third piece of glass prepared to be associated with the parts indicated in Figs. 1 and 2.
Figure 4:
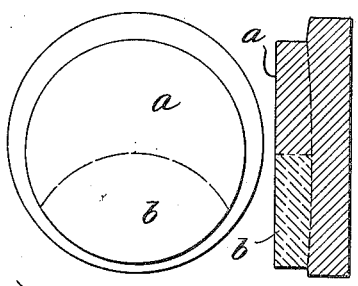
Fig. 4 is a face view and section of the parts shown in Figs. 1, 2 and 3 associated together to form a lens blank.
Figure 5:
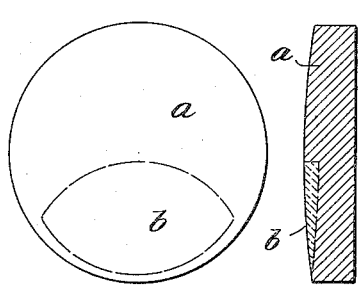
Fig. 5 is a face view and section of the lens blank finished on one side.

I next take a piece or plate of crown glass of exactly the same refractive index as the part $a$ and I form therein upon one face a finished lenticular surface or countersink $d$ corresponding in curvature to the surface $c$ of Fig. 2. I then place together the button of Fig. 2 and the plate of Fig. 3 so that the surface $c$ of the button will fit into the surface $d$ of Fig. 3, and place the assembled parts in a furnace or use other means to bring them to such a heat that the two parts will be fused together along their contacting surfaces without destroying the curvature of those surfaces, which curvature is to become one of the factors in determining the final powers of the various parts of the finished lens. This produces a rough fused blank containing two different kinds of glass, the upper part of the blank being all of crown glass, while the lower part is crown glass overlaid by flint glass. This blank is then to be ground and polished on its front side with a uniform lenticular surface extending throughout the same. Such surface will then contain a portion of flint glass $b$ and a portion of crown glass $a$, as indicated in Fig. 5. The next operation is to cut from this semi-finished blank a piece of glass having the outline and size of the finished lens. If the finished lens is to be circular in outline it is obvious that if the center of the circle is located in the curved line of joinder between the crown and flint portions, the optical center of the front or finished side of the lens will be at the same point. On the other hand if the center of the circle representing the outline of the finished lens is located above the curved line of joinder between the crown and flint portions, the optical center of the portion of crown will be at the center of the lens while the optical center of the portion of flint will be below the optical center of the portion of the crown to the extent that the line of joinder between the crown and flint is dropped below the center of the circular lens. The next operation to complete the lens is to grind and polish the back surface of the blank to any required curvature. In performing this grinding operation the grinding tool must be set and the glass so mounted with respect thereto that when finished the lens, if circular in outline, will be of equal thickness at all points around its edge.

The finished lens of Fig. 6 is monocentric, that is to say, the optical axes of both fields of vision pass through the physical center of the lens. Best vision is obtained when the eye is directed through the optical center of the lens but there is a small area around the optical center through which vision is uniformly good, the effects of aberration not being apparent until the line of vision approaches the edge of the lens. Therefore, with a lens having the center of both fields at the physical center of the lens as in Fig. 6, the eye will experience good vision through both fields with only the slight movement required to cross the line of joinder between the two fields, as illustrated for instance by the angle between the two lines of vision $x$ and $y$ in Fig. 6. In the finished lens of Fig. 7 the optical axis of the upper field is at the physical center of the lens while the axis of the lower field is decentered some distance therefrom, thus making it necessary for the eye to swing through a more considerable angle in making the excursion from one field of vision to the other. These two different styles of lenses meet the requirements of different persons and it will therefore be seen that by constructing a lens in this manner the optical centers can all be placed at one point or spaced apart to any extent required. At whatever distance the two optical centers may be located from each other the vision will not be disturbed by either spherical or prismatic aberration. In the trifocal illustrated in Fig. 8 the interposed piece of glass $e$ is to be fused between the parts $a$ and $b$, the part $b$ in this case having an index higher than that of $e$. This lens may be finished monocentric with respect to the upper and middle fields and when decentered the centers of the two lower fields will be equally displaced from the center of the upper field.

I claim:

1. The method of making a multifocal lens which consists in placing together edge to edge a plurality of plates of glass of different indices of refraction, then superposing said plates face to face upon another plate of glass having an index of refraction the same as that of one of the first mentioned plates and shaping the lens to include a portion of all of the plates.

2. The method of making a multifocal lens which consists in fusing together edge to edge a plurality of plates of glass of different indices of refraction, then fusing the compound structure thus produced face to face with another plate of glass having an index of refraction the same as that of one of the first mentioned plates and shaping the lens to include a portion of all of the plates.

3. The method of making a multifocal lens which consists in fusing together edge to edge a plurality of plates of glass of different indices of refraction, then fusing the compound structure thus produced, face to face to a lenticular surface on another plate of glass having an index of refraction the same as that of one of the first mentioned plates and shaping and finishing the lens to include a portion of all of the plates.

4. The method of making a multifocal lens which consists in fusing together edge to edge a plurality of plates of glass of different indices of refraction, then fusing the compound structure thus produced, face to face to a lenticular surface on another plate of glass having an index of refraction the same as that of one of the first mentioned plates, then grinding and finishing a single uniform lenticular surface on that side of the structure containing the first mentioned plates and having exposed therein glass of at least two different indices, then shaping the edge or outline of the structure to bring the edge to edge joints therein at any required distance from the enter of the structure and finally grinding and finishing a lenticular surface on the other or back face of the structure.

In witness whereof, I hereunto subscribe my signature.

GEORGE A. CLEMENT.